United States Patent
Fabien et al.

(10) Patent No.: US 7,729,703 B2
(45) Date of Patent: Jun. 1, 2010

(54) APPARATUS AND METHOD FOR REPORTING A CHANNEL QUALITY INDICATION TO NON-SERVING CELLS

(75) Inventors: Jean-Aicard Fabien, Lincolnshire, IL (US); Richard C. Burbidge, Hook (GB); Zhijun Cai, Euless, TX (US); Robert T. Love, Barrington, IL (US); Agnes M. Revel, Southampton (GB)

(73) Assignee: Motorola, Inc., Schaumburg, IL (US)

( * ) Notice: Subject to any disclaimer, the term of this patent is extended or adjusted under 35 U.S.C. 154(b) by 867 days.

(21) Appl. No.: 11/412,300

(22) Filed: Apr. 27, 2006

(65) Prior Publication Data

US 2007/0254658 A1    Nov. 1, 2007

(51) Int. Cl.
*H04W 72/00*    (2009.01)
*H04W 36/00*    (2009.01)

(52) U.S. Cl. .................. 455/452.2; 455/436; 455/437; 455/439

(58) Field of Classification Search .................. 455/436, 455/437, 439, 452.2
See application file for complete search history.

(56) References Cited

U.S. PATENT DOCUMENTS

| | | | |
|---|---|---|---|
| 7,362,726 B2 * | 4/2008 | Petrovic et al. | 370/329 |
| 2003/0031119 A1 * | 2/2003 | Kim et al. | 370/200 |
| 2007/0254595 A1 * | 11/2007 | Yoon et al. | 455/67.14 |

FOREIGN PATENT DOCUMENTS

| | | |
|---|---|---|
| EP | 1 519 519 A1 | 3/2005 |
| WO | WO 2005/029785 A1 | 3/2005 |
| WO | WO 2005/125044 A1 | 12/2005 |
| WO | WO 2005/125250 A1 | 12/2005 |
| WO | WO 2006/000091 A1 | 1/2006 |

OTHER PUBLICATIONS

"$3^{RD}$ Generation partnership Project; Technical Specification Group Radio Access network; Interlayer procedures in Connected Mode (Release 6)", 3G—TS 25.303 V6.3.0 (Jun. 2005) Technical Specification, 76 pages.

"$3^{rd}$ Generation Partnership project; Technical Specification Group Radio Access Network; Medium Access Control (MAC) protocol specification (Release 6)", 3GPP TS 25.321 V6.6.0 (Sep. 2005), 86 pages.

(Continued)

*Primary Examiner*—Nick Corsaro
*Assistant Examiner*—Shannon R Brooks
(74) *Attorney, Agent, or Firm*—Gary J. Cunningham

(57) ABSTRACT

A method in a wireless communication device and an apparatus, such as a wireless communication device, for reporting a channel quality indication to non-serving cells. The device can operate on a shared channel on a serving cell. The device can send a channel quality indicator message on a medium access control layer to multiple candidate cells in an active set of cells. The device can then switch from the serving cell to a new serving cell from the multiple candidate cells based on information in the channel quality indicator message.

11 Claims, 3 Drawing Sheets

OTHER PUBLICATIONS

"3$^{rd}$ Generation Partnership Project; Technical Specification Group Radio Access Network; Physical layer procedures (FDD) (Release 6)", 3GPP TS 25.214 V6.8.0 (Mar. 2006) Technical Specification, 60 pages.

International Search Report and Written Opinion dated Jan. 11, 2008 issued by the U.S. Patent and Trademark Office as International Searching Authority in connection with International Application No. PCT/US07/64860 (8 pages).

* cited by examiner

FIG. 3 is an exemplary flowchart illustrating the operation of a wireless communication device according to one embodiment.

APPARATUS AND METHOD FOR REPORTING A CHANNEL QUALITY INDICATION TO NON-SERVING CELLS

BACKGROUND

1. Field

The present disclosure is directed to a method and apparatus for reporting a channel quality indication to non-serving cells. More particularly, the present disclosure is directed to sending a channel quality indicator directly to multiple candidate cells in an active set of cells that can enable fast handover procedure for uplink and downlink High Speed Data Shared transmissions.

2. Description of Related Art

Presently, shared channels, such as High Speed Downlink Packet Access (HSDPA) and High Speed Uplink Packet Access (HSUPA) are being proposed in evolution networks to provide high throughput not only for packet data traffic such as video streaming, file download and web browsing, but also for real-time services such as Voice over Internet Protocol (VOIP) traffic. Typically a mobile device in a single coverage area, such as not in a potential handover situation, will utilize physical layer control messages to support link adaptation procedures such as Hybrid Automatic Repeat Request (HARQ) feedback signals and quality measurement reports. These physical layer control messages have low latency characteristics that provide for selection of modulation and coding schema adaptive to the mobile radio environment.

In a multiple coverage area, a mobile in soft handover will send a layer 3 measurement report to the serving radio network controller. Non-serving cells will only be aware of an order of the active set from messages relayed by the serving radio network controller. Quality measurement information is only sent to the scheduling/serving cell. Unfortunately, if the best cell is not the scheduling cell, there is no mechanism for switching the scheduling/serving cell without going through the serving radio network controller which is a slow process that results on loss of data transmitted over High Speed Data Shared during handover.

Thus, there is a need for a method in a wireless communication device and an apparatus, such as a wireless communication device, for reporting a channel quality indication to non-serving cells.

SUMMARY

A method in a wireless communication device and an apparatus, such as a wireless communication device, for reporting a channel quality indication to non-serving cells. The device can operate on a shared channel on a serving cell. The device can send a channel quality indicator message on a medium access control layer to multiple candidate cells in an active set of cells. The device can then switch from the serving cell to a new serving cell from the multiple candidate cells based on information in the channel quality indicator message.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
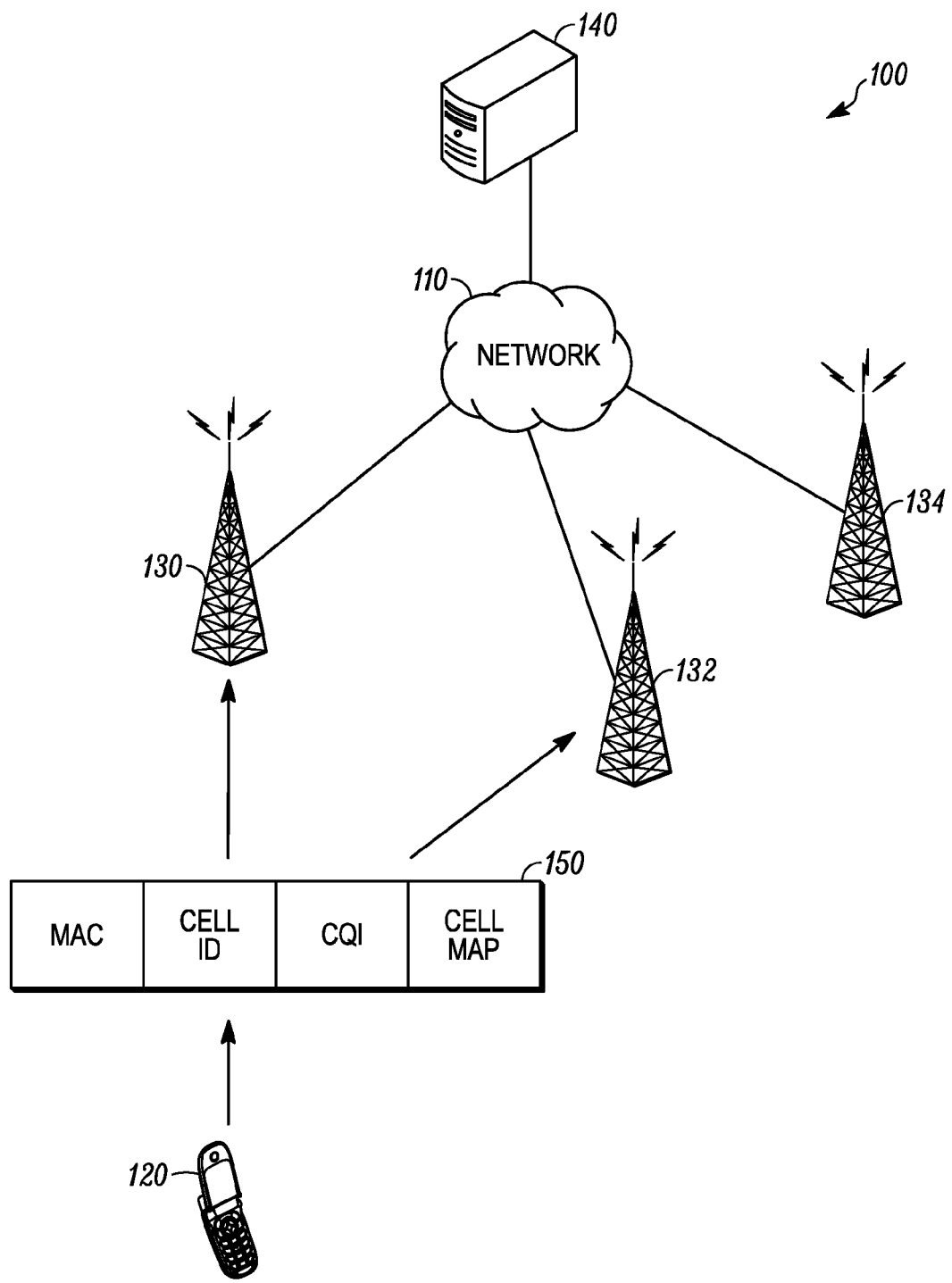
FIG. 1 is an exemplary block diagram of a system according to one embodiment.

FIG. 1 is an exemplary block diagram of a system 100 according to one embodiment. The system 100 can include a network controller 140, a network 110, base stations 130, 132, and 134, and a terminal 120. The terminal 120 may be a wireless communication device, such as a wireless telephone, a cellular telephone, a personal digital assistant, a pager, a personal computer, a selective call receiver, or any other device that is capable of sending and receiving communication signals on a network including wireless network.

In an exemplary embodiment, the network controller 140 is connected to the network 110. The controller 140 may be located at a base station, at a radio network controller, or anywhere else on the network 110. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a Wideband Code Division Multiple Access (WCDMA) network, a Long Term Evolution (LTE) network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the terminal 120 can operate on a shared channel on a serving cell, such as a cell at the base station 130. The terminal 120 can send, on a medium access control layer, a channel quality indicator (CQI) based on a derived power for a downlink shared channel based on a common pilot measurement of each cell of the active set of cells and a candidate cell map directly to multiple candidate cells in an active set of cells, such as cells associated with the base station 132 and the base station 134. For example, an active set can include the list of the cells that the terminal 120 is connected to when in handover. The channel quality indicator may be included in a message 150. The message 150 can include a medium access control layer header (MAC header), a cell identifier (CELL ID), a channel quality indicator (CQI) for the cell the message 150 is being sent to, and a cell rank map (CELL MAP). The terminal 120 can receive a hybrid automatic repeat request (HARQ) feedback message from a candidate cell, such as a cell at base station 132, of the multiple candidate cells, the hybrid automatic repeat request feedback message can indicate receipt of the channel quality indicator message. The terminal 120 can then switch from the serving cell at base station 130 to the new serving cell at base station 132 from the multiple candidate cells based on information in the channel quality indicator, or based on command from one of the cells of the active set of cells.

The channel quality indicator can typically be based on downlink common pilot power of a cell of the active set of cells measured by the terminal 120. For example, in high speed downlink data packet access (HSDPA), the channel quality indicator can be an implicit message. Previously, there was no cell identification and the channel quality indicator was based on the measurement of the common pilot channel (CPICH) power of the serving cell. For network architectures where mobility is managed at the edge node, such as in a serving cell at the base station 130, in coordination with adjacent nodes, an explicit message structure with more detail on the mobile relative radio environment can be used by all cells of the active set of cells. For network architecture such as WCDMA where there is a centralized controller, such as the controller 140, the handover procedure used for dedicated channel is too slow for a downlink shared channel supporting real time services. The present disclosure provides a general structure that enables channel quality indicator of each cell of the active set of cells reporting to all cells of the active set of cells. For example, a channel quality indicator message 150 can be reported to each cell of the active set of cells. The message 150 can include a MAC header, a CELL ID, a CQI for the cell the message 150 is being sent to, and a CELL MAP. The MAC header can provide specific transport channel format information, logical channel designation, and may include the CELL ID. The CELL ID can identify the cell for which the CQI is being reported. An extra CELL ID field may not be required if it is already in the MAC header. The CQI can identify a derived power for a downlink shared channel based on a common pilot measurement of each cell of the active set of cells. The CELL MAP can provide a cell ranking with a cell order based on CQI measurement strength which can be truncated to the size of the active set or to the size of the multiple coverage area Edge Node list.

For example, in a Wideband Code Division Multiple Access (WCDMA) system, the terminal 120 can measure the power from the common pilot channel ($P_{CPICH}$) for each member of the active set and can calculate the CQI using $P_{HSDSCHi} = P_{CPICHi} + \Gamma_i + \Delta$ for each non serving cell i. Where $P_{HSDSCHi}$ represents the power of the shared channel, $P_{CPICHi}$ represents the power of the pilot channel, $\Gamma_i$ represents measurement offset signaled by the network and $\Delta$ represents a reference power adjustment based on wireless communication device designated as User Equipment category. The measurement offset may be different for each non serving cell.

To enable fast shared channel handover procedure in WCDMA, and for Long Term Evolution (LTE) technologies, such as 4G, the Layer-2 CQI report can be sent using an Enhanced Data Channel for HSUPA (E-DCH) transport channel with H-ARQ, or any uplink shared channel with H-ARQ. When the CQI message is sent to each cell of the active set of cells, including the serving or scheduling cell, the terminal 120 can send the CQI message until an acknowledgement is received from the destination cell. If the terminal 120 sends a Layer 2 CQI message to the other members of the active set, it may wait for an acknowledgement or it may repeat sending the report until an acknowledgement is received.

Thus, the system 100 can allow for fast cell selection because the ranking in the cell map and the CQI field allows for a faster decision, either at the terminal 120 or in the network 110, for a new scheduling/serving cell. The system 100 can also allow for a more efficient handover procedure because the CQI reporting, in addition to context transfer, such as channel transfer information, between Nodes, allows for a make before break procedure and mitigates the need for uplink macro diversity.

Figure 2:
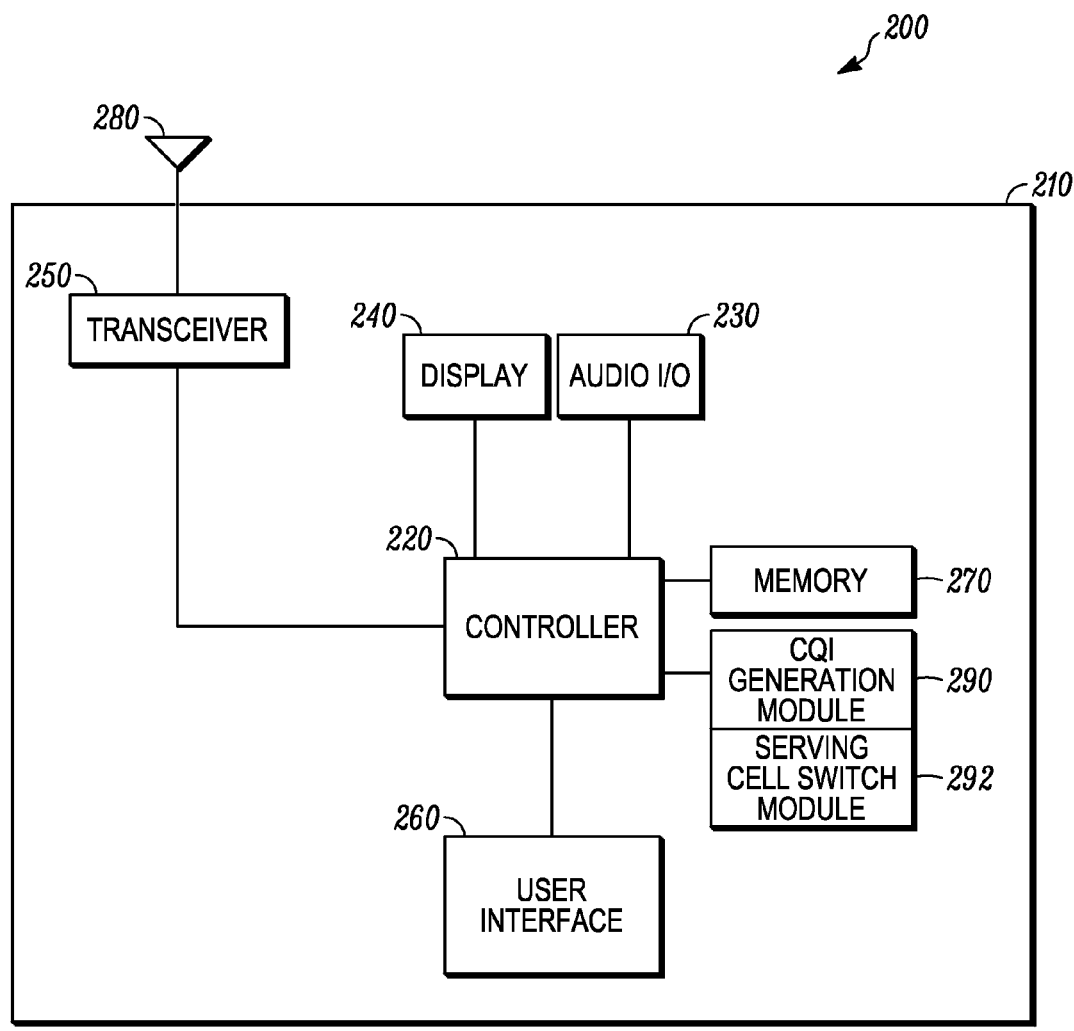
FIG. 2 is an exemplary block diagram of a wireless communication device according to one embodiment.

FIG. 2 is an exemplary block diagram of a wireless communication device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a channel quality indicator message generation module 290 and a serving cell switch module 292. The channel quality indicator message generation module 290 and the serving cell switch module 292 can be coupled to the controller 220, can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the receiver in the transceiver 250 can receive signals on a shared channel on a serving cell. A shared channel can be a high speed downlink packet access channel, a high speed uplink packet access channel, or any other shared channel. The controller 220 can control operations of the wireless communication device 200. The channel quality indicator message generation module 290 can generate a channel quality indicator message. The channel quality indicator message can include a medium access control header, a cell identifier, a channel quality indicator field, and a candidate cell map. The channel quality indicator message can also include a channel quality indicator field including a channel quality indicator based on a derived power for a downlink shared channel based on a common pilot measurement.

The transmitter in the transceiver 250 can send the channel quality indicator message on a medium access control layer to multiple candidate cells in an active set of cells. The transmitter can send the channel quality indicator on an enhanced uplink dedicated channel. The controller 220 can process a hybrid automatic repeat request feedback message received via the receiver from a candidate cell of the multiple candidate cells, the hybrid automatic repeat request feedback message indicating receipt of the channel quality indicator message by the candidate cell.

The serving cell switch module 292 can select a new serving cell based on information received from the serving cell regarding which candidate cell to select as the new serving cell. The serving cell switch module 292 may select the new serving cell based on information in the channel quality indicator message with or without information received from the serving cell for which candidate cell to select as the new serving cell. The serving cell switch module 292 can switch from the serving cell to the new serving cell from the multiple candidate cells based on information in the channel quality indicator message.

Figure 3:
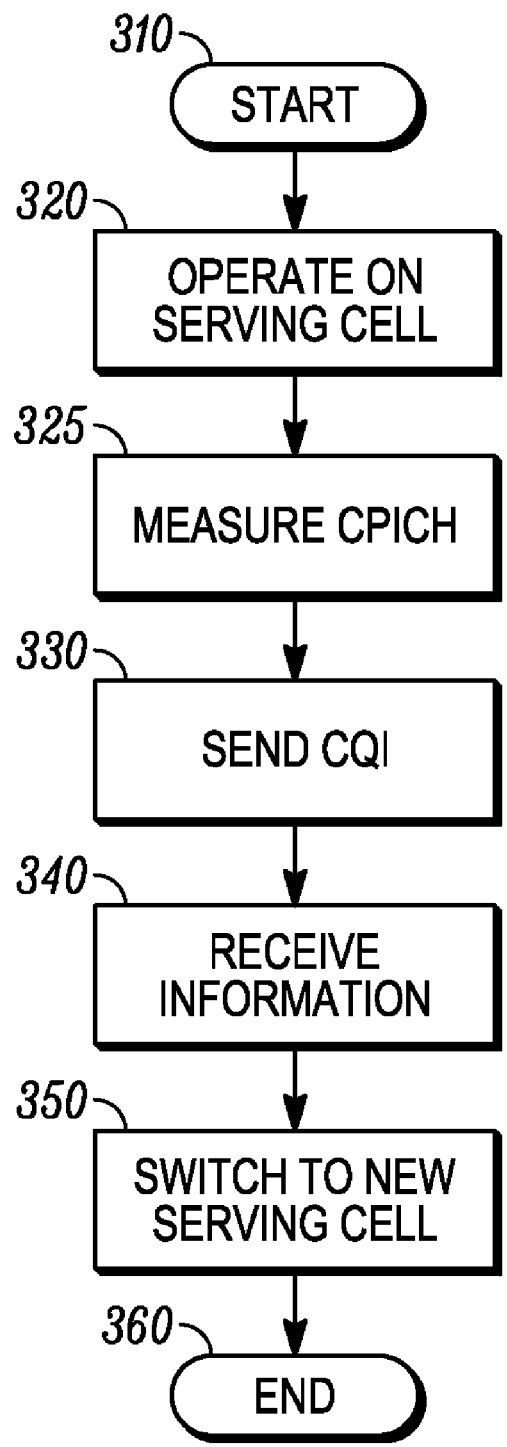
FIG. 3 is an exemplary flowchart illustrating the operation of a wireless communication device according to one embodiment.

FIG. 3 is an exemplary flowchart 300 illustrating the operation of the wireless communication device 200 according to another embodiment. In step 310, the flowchart begins. In step 320, the wireless communication device 200 can operate on a shared channel on a serving cell. In step 325, the wireless communication device 200 can measure the signal to noise ratio of the common pilot channel (CPICH) for each cell of the active set of cells. In step 330, the wireless communication device 200 can send a channel quality indicator message on a medium access control layer to multiple candidate cells in an active set of cells. The channel quality indicator message can include a medium access control header, a cell identifier, a channel quality indicator field, and a candidate cell map. The candidate cell map can include a desired order of candidate cells, a weight of candidate cells, an indication of a preference of candidate cells, or other information indicating a preference of candidate cells over other candidate cells for cell switching. The channel quality indicator message can also include a channel quality indicator field including a channel quality indicator based on a derived power for a downlink shared channel based on a common pilot measurement of each cell of the active set of cells. The channel quality indicator can be sent on an enhanced uplink dedicated channel. The shared channel can be a high speed uplink packet access channel, or any other shared channel.

In step 340, the wireless communication device 200 can receive information. For example, the wireless communication device 200 can receive a hybrid automatic repeat request feedback message from a candidate cell of the multiple candidate cells, the hybrid automatic repeat request feedback message indicating receipt of the channel quality indicator message. As another example, the wireless communication device 200 can receive information from the serving cell regarding which candidate cell to select as the new serving cell. The wireless communication device 200 can also determine which candidate cell to select as the new serving cell by using its own resources with or without receiving information from the serving cell regarding which candidate cell to select as the new serving cell.

In step 350, the wireless communication device 200 can switch from the serving cell to a new serving cell from the multiple candidate cells based on information in the channel quality indicator message. In step 360, the flowchart 300 can end.

Thus, the present disclosure can provide for a structure that enables CQI reporting directly to cells in multiple coverage areas. The structure can use link adaptation using a HARQ message to mitigate coverage issues that prohibit multiple cell CQI reporting using physical layer messages. The present disclosure also provides a procedure for transmission of a Layer-2 CQI report to the scheduling/serving cell, to the best cell(s), and to other cells in a multiple coverage area. The structure can enable fast cell selection and/or fast handover procedure based on either terminal or network control. The structure can also optimize priming of a potential serving cell and can reduce HARQ initialization latency after a scheduling/serving cell change. The structure can also provide for Layer-2 CQI reporting that may be implemented for all technologies where downlink shared channels are used with adaptive modulation coding (AMC) and HARQ and with a corresponding uplink channel using similar link adaptation procedures. The present disclosure can further provide for real time services in multiple coverage areas for downlink shared channels, such as high speed downlink shared channel (HS-DSCH) operation, reducing switching latency from an old serving cell to a new serving cell within the active set of cells. Otherwise, Layer-1 CQI reporting to a non-serving cell may require higher terminal transmission power, which may limit coverage and reduce user throughput. The present disclosure can additionally provide for Layer-2 CQI reporting using the efficiency of a shared channel with HARQ and an improved format of CQI reporting with ranking list to facilitate the implementation of fast cell selection. The Layer-2 CQI reporting may be used for handover in network architectures with higher layer protocol architecture terminating in the edge node, such as the serving cell. It may be used in addition with context/channel transfer between neighbor nodes/cells to allow a make before break handover procedure without the need for uplink macro diversity. This structure can enable CQI reporting directly to cells in multiple coverage situations. The structure can use link adaptation using HARQ to mitigate coverage issues that prohibit multiple cell CQI reporting using physical layer messages. For example, the present disclosure can be used for Voice over Internet Protocol (Voice over IP) over High Speed Downlink Packet Access (HSDPA) and High Speed Uplink Packet Access (HSUPA) for WCDMA. The present disclosure may also be used for real time services over Enhanced Universal Terrestrial Radio Access (EUTRA) for inter-edge node handover. The present disclosure may also be used with Worldwide Interoperability for Microwave Access (WIMAX) and other 802-based or other Wireless Local Area Network (WLAN) or access point-based systems.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A wireless communication device comprising:
a receiver configured to receive signals on a shared channel on a serving cell;

a controller coupled to the receiver, the controller configured to control operations of the wireless communication device;

a channel quality indicator message generation module coupled to the controller, the channel quality indicator message generation module configured to generate a channel quality indicator message for each candidate cell of multiple candidate cells in an active set of cells, wherein the channel quality indicator message includes a cell identifier identifying a candidate cell for which channel quality is being reported, a channel quality indicator for the candidate cell identified by the cell identifier, and a candidate cell map, wherein the candidate cell map includes a list of the multiple candidate cells in the active set of cells, and wherein the list is ordered based at least on channel qualities of the multiple candidate cells as determined by the wireless communication device;

a transmitter operating under control of the controller to send each channel quality indicator message on a medium access control layer to a respective one of the multiple candidate cells in the active set of cells; and a serving cell switch module coupled to the controller, the serving cell switch module configured to switch from the serving cell to a new serving cell from the multiple candidate cells based on the candidate cell map.

2. The wireless communication device according to claim 1, wherein the controller is configured to process a hybrid automatic repeat request feedback message received via the receiver from at least one candidate cell of the multiple candidate cells, the hybrid automatic repeat request feedback message indicating receipt of at least one channel quality indicator message.

3. The wireless communication device according to claim 1, wherein the serving cell switch module is configured to select the new serving cell based on information received from the serving cell regarding which candidate cell to select as the new serving cell.

4. The wireless communication device according to claim 1, wherein the serving cell switch module is configured to select the new serving cell based on information in the candidate cell map independent of information from the serving cell.

5. The wireless communication device according to claim 2, wherein the controller is configured to process a hybrid automatic repeat request feedback message received via the receiver from each candidate cell of the multiple candidate cells, each hybrid automatic repeat request feedback message indicating receipt of a corresponding channel quality indicator message.

6. The wireless communication device according to claim 1, wherein the channel quality indicator is based on a derived power for a downlink shared channel based on a common pilot measurement of the cell identified by the cell identifier.

7. The wireless communication device according to claim 1, wherein the transmitter is configured to send each channel quality indicator message on an enhanced uplink dedicated channel.

8. The wireless communication device according to claim 1, wherein an order of the list of the multiple candidate cells in the active set of cells is based further on at least one of a desired order of the candidate cells, weights assigned to the candidate cells, and an indication of a preference of the candidate cells.

9. A method in a wireless communication device comprising:

operating on a shared channel on a serving cell;

determining downlink channel qualities for multiple candidate cells in an active set of cells based on a derived power for a downlink shared channel based on a common pilot measurement of each cell of the active set of cells;

sending, on a medium access control layer, a channel quality indicator message including a channel quality indicator and a candidate cell map to each of the multiple candidate cells in the active set of cells, each channel quality indicator being based on a determined downlink channel quality for a particular candidate cell of the multiple candidate cells, the candidate cell map including a list of the multiple candidate cells in the active set of cells, wherein the list is ordered based at least on the downlink channel qualities of the multiple candidate cells;

receiving, from each candidate cell of the multiple candidate cells in the active set of cells, a hybrid automatic repeat request feedback message acknowledging receipt of the channel quality indicator message; and switching from the serving cell to a new serving cell from the multiple candidate cells based on the candidate cell map.

10. A wireless communication device operable to receive signals on a shared channel from a serving cell, the wireless communication device comprising:

a controller configured to control operations of the wireless communication device;

a channel quality indicator message generation module coupled to the controller, the channel quality indicator message generation module configured to generate channel quality indicator messages, each channel quality indicator message including a channel quality indicator and candidate cell map, the channel quality indicator indicating a downlink channel quality for a corresponding candidate cell of multiple candidate cells in an active set of cells, the candidate cell map including a list of the multiple candidate cells in the active set of cells, wherein the list is ordered based at least on downlink channel qualities of the multiple candidate cells;

a transmitter coupled to the controller, the transmitter configured to send each channel quality indicator message as a Layer-2 report message to the multiple candidate cells in the active set of cells;

a serving cell switch module coupled to the controller, the serving cell switch module configured to switch from the serving cell to a new serving cell from the multiple candidate cells based on the candidate cell map; and a receiver coupled to the controller, the receiver configured to receive from each candidate cell of the multiple candidate cells a hybrid automatic repeat request feedback message acknowledging receipt of a respective channel quality indicator message.

11. The wireless communication device of claim 10, wherein the Layer-2 report message is a medium access control layer message.

* * * * *